United States Patent [19]

Burbank et al.

[11] Patent Number: 4,534,433
[45] Date of Patent: Aug. 13, 1985

[54] MATERIAL HANDLING VEHICLE

[75] Inventors: Charles H. Burbank, Geneseo; Robert J. Lewis, Binghamton, both of N.Y.

[73] Assignee: The Raymond Corporation, Greene, N.Y.

[21] Appl. No.: 533,130

[22] Filed: Sep. 19, 1983

[51] Int. Cl.³ .............................................. B62D 51/04
[52] U.S. Cl. ..................................... 180/19.1; 180/21; 280/5.2; 16/18 B
[58] Field of Search ................ 180/19.1, 21, 211, 214, 180/209; 16/18 R, 18 B, 47, 48; 280/5.2, 5.22

[56] References Cited

U.S. PATENT DOCUMENTS 2,123,707  7/1938  Block .................................. 280/5.2
2,564,002  8/1951  Gibson ................................. 180/21

FOREIGN PATENT DOCUMENTS 584079  1/1947  United Kingdom ............... 280/5.22

Primary Examiner—Joseph P. Peters, Jr.
Assistant Examiner—Donn McGiehan
Attorney, Agent, or Firm—Richard G. Stephens

[57] ABSTRACT

An auxiliary wheel is mounted on a lift truck caster wheel assembly to normally be carried above the floor, but to engage the floor to prevent overturning, thereby increasing the lateral stability of the truck.

7 Claims, 6 Drawing Figures

MATERIAL HANDLING VEHICLE

This invention relates to material handling vehicles, notably lift trucks, and more particularly, to means for increasing the lateral stability of a lift truck having an off-center caster wheel.

One widely used form of lift truck principally intended for use in narrow aisles of a warehouse utilizes a pair of non-steerable front load wheels, a powered steerable drive wheel near one rear corner of the truck, and a non-powered self-steering caster wheel assembly at the other rear corner of the truck. See, for example, U.S. Pat. No. 2,564,002 issued to Christian D. Gibson. Trucks having such a wheel arrangement have the advantages of a short turning radius, and better lateral stability than three-wheel trucks which have the rear drive wheel on the centerline of the truck. However, the lateral stability of such a truck varies in proportion to the lateral distance between the points where its rear wheels engage the floor. As a truck of the mentioned type performs various maneuvers, the lateral stability of the truck varies as the caster wheel assembly swivels, providing a maximum lateral stability when the caster wheel assembly has been swung adjacent a lateral extremity of the truck, and providing a minimum lateral stability when the caster wheel assembly has swung inwardly underneath the truck. To insure that the powered drive wheel will maintain contact with the floor when the floor is uneven, the caster wheel is resiliently mounted on the base of the truck. The use of a spring mounting allows the vehicle to tilt more easily than if the caster wheel were rigidly mounted, and hence tends to further decrease lateral stability.

A principal object of the invention is to decrease the utility of such trucks by improving the lateral stability of the truck. An attendant object of the invention is to improve the lateral stability without increasing the width of the truck, or the aisle width required for the truck to operate in. Another object of the invention is to increase the lateral stability of such a truck at a very modest cost.

In accordance with the present invention, an auxiliary wheel is mounted on the caster wheel assembly, to swing with the self-steering caster wheel. The auxiliary wheel is mounted on the opposite side of the caster swivel axis from the caster wheel, so that as the caster wheel swings to its maximum inward position under the truck, tending to minimize lateral stability, the auxiliary wheel is swung to a maximum outward position under the truck. The auxiliary wheel is mounted on the caster wheel assembly so that it normally does not touch the floor, but instead rides above the floor with an appreciable clearance, typically of the order of $\frac{5}{8}$ inch. That allows the caster wheel to steer in its normal fashion, without scrubbing of the caster wheel, and it prevents the auxiliary wheel from engaging the floor when typical floor irregularities are encountered. But if any operating condition laterally shifts the center-of gravity of the truck sufficiently to begin to overturn the truck, the auxiliary wheel then engages the floor, preventing overturning of the truck.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 2C:
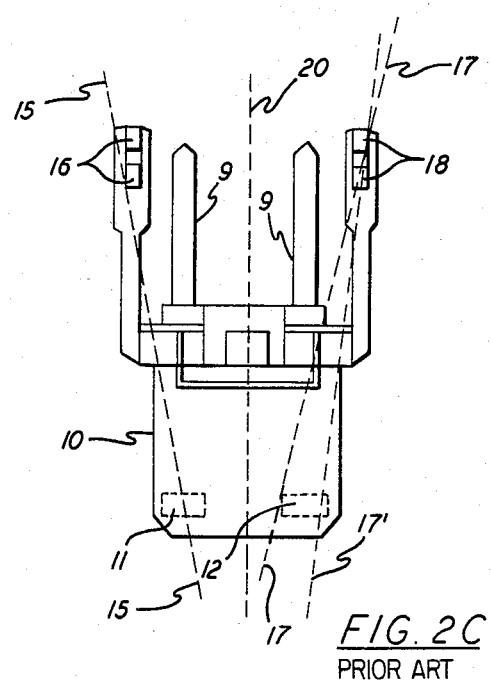
FIGS. 2a, 2b and 2c are diagrams illustrating a wheel arrangement of the prior art.
Figure 2A:
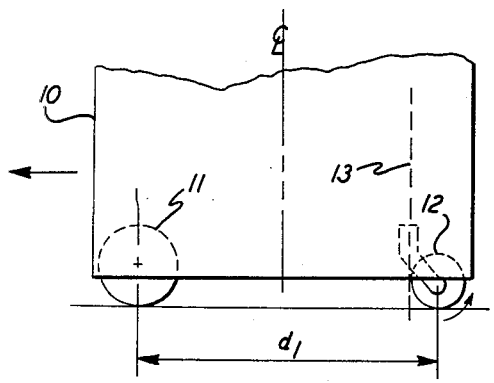
Figure 2B:
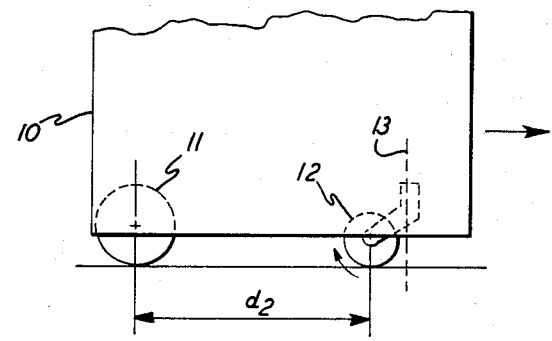

In FIG. 2a which presents a rear elevation view of a portion of a prior art truck, the truck 10 is driven by a powered steerable drive wheel 11 mounted adjacent one rear corner of the truck, and the truck is supported by a caster wheel 12 which pivots about a vertical axis 13. FIG. 2a illustrates a condition in which the rear end of the truck is moving leftwardly, so that trailing caster wheel 12 is swung outwardly, to engage the floor near the rightward lateral extremity of the truck. The lateral distance between the axles of wheels 11,12, which corresponds to the lateral distance between the points at which those wheels engage the floor, is shown as distance $d_1$. FIG. 2b illustrates a converse condition in which the rear end of the truck is moving rightwardly, so that caster wheel 12 is swung inwardly under the truck, to engage the floor substantially nearer where drive wheel 11 engages the floor than in the case of FIG. 2a. During most travel of the truck, typified by straight line travel the axle of caster wheel 12 will lie centered on axis 13, midway between the two extreme positions shown in FIGS. 2a and 2b, and as turns of various radii are made caster wheel 12 will assume a variety of positions intermediate the two extremes shown.

In FIG. 2c an axis 15 is shown extending between the drive wheel 11 and the load wheel assembly 16 on the left side of the truck, and another axis 17 is shown extending between caster wheel 12 and load wheel assembly 18 on the right side of the truck. The truck will topple over leftwardly if a resultant force vector on the truck points outside axis 15, or the truck will topple over rightwardly if the direction of the mentioned resultant force vector points outside axis 17. The location of axis 17 will be understood to vary in accordance with the lateral position of caster wheel 12.

When the truck is standing still, the mentioned resultant force vector simply comprises the weight of the truck and the load (not shown) carried on forks 9,9. If the load is approximately centered laterally on the forks, the overall center-of-gravity of the truck and load will lie on or near centerline 20. The resultant force vector ordinarily will point in between axes 15 and 17, but sufficiently laterally-acting floor slope manifestly can cause the truck to overturn. The amount of slope which can be tolerated depends upon the height of the overall center-of-gravity which height varies, of course, as a load is lifted or lowered.

When the truck is moving and turning on a level floor, the mentioned resultant force vector comprises the vector resultant of a weight vector W which points downwardly, and a horizontal centrifugal force vector. In terms of moments about axis 17, as the truck is turning leftwardly, i.e. rear end moving rightwardly, weight applies a counterclockwise moment of magnitude Wx to the truck, where x is the lateral distance between the center-of-gravity of the truck and axis 17, and centrifugal force applies a clockwise moment of magnitude $(W/g)(V^2/r)h$ to the truck, where V is the speed of the truck, r is the radius of turn, g is gravitational acceleration, and h is the vertical distance between the center-of-gravity and axis 17. The truck will topple over if the clockwise centrifugal moment exceeds the counterclockwise weight moment. The speed at which the truck will start to overturn thus is given by: $V = \sqrt{gxr/h}$.

Assume that the overall center-of-gravity lies on the longitudinal axis 20. The lateral distance x of the center-of-gravity from tilt axis 17 depends on how far rearward that center-of-gravity is located. In a typical prior art truck wherein load wheel assemblies 16 and 18 are 48 inches apart, the steering axes of wheels 11 and 12 are 24 inches apart and are about 55 inches behind the load wheels, the center-of-gravity is 24 inches behind the load wheels, and the caster has a lead of 2.5 inches, the lateral distance of the center- of-gravity from axis 17 will vary approximately 12%, from a value of 17.67 to a value of 19.85, as the caster wheel swings between the two extreme positions shown in FIGS. 2a and 2b.

Because the minimum amount of centrifugal force which will cause the truck to overturn has been governed by the location of axis 17 when caster wheel 12 has been swung to its innermost position, it has been usual practice to limit truck speeds as a function of turning radius so that the operator cannot overturn such a truck. Such limiting of speed to accomplish safe operation during turns is, of course, vital, but it undesirably and unnecessarily slows down material handling operations. Trucks can be slowed only when turning, but this is not very effective. Because such trucks spend a large percentage of their operating times in straight or nearly straight travel, even a small percentage increase in allowable operating speed has important economic benefits.

Figure 3:
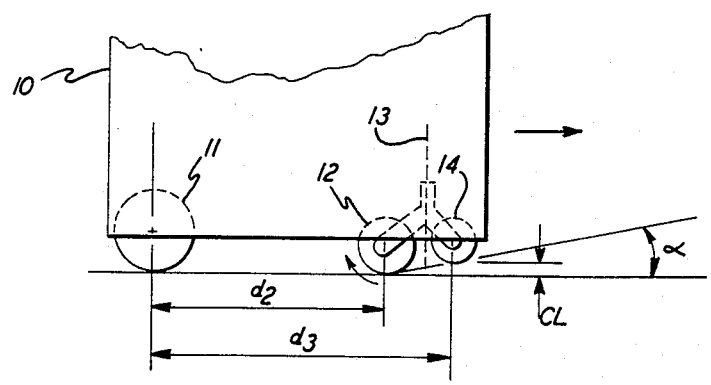
FIG. 3 is a diagram useful in understanding operation of the present invention.

In FIG. 3 diagrammatically illustrating the present invention, the caster wheel 12 again is shown swung to its maximum inward position, but auxiliary wheel 14, mounted to swing about axis 13 with caster wheel 12, but located on the opposite side of axis 13 from wheel 12, then is swung to its maximum outward position. Auxiliary wheel 14 clears the floor by a clearance dimention CL, shown exaggerated in FIG. 3. With auxiliary wheel 14 normally clearing the floor, caster wheel 12 will be self-steering in its usual fashion during normal conditions. If the overall force vector is shifted rightwardly beyond axis 17, the truck will start to overturn, but after a small clockwise (in FIG. 2c) rotation of the truck, auxiliary wheel 14 will engage the floor, so that truck stability then will be governed by larger dimension $d_3$. Thus after the small rotation, the tipping line extends between auxiliary wheel 14 and the rightside load wheel assembly 18, along axis 17', rather than between caster wheel 12 and load wheel assembly 18.

Assuming for the moment that the elevations of wheels 12 and 14 are fixed to establish the dimension CL shown in FIG. 3, it will be seen that the truck must tilt through the appreciable angle $\alpha$ before auxiliary wheel 14 touches the floor. Because tilting of the truck moves the center-of-gravity laterally toward the tilt axis, tending to increase the net overturning moment, it is necessary that auxiliary wheel 14 touch the floor before too much tilting occurs. That requirement could be satisfied by making clearance distance CL very small, but then the auxiliary wheel undesirably would engage minor floor irregularities and interfere with normal travel. However, because the caster wheel means 12 is resiliently mounted, the auxiliary wheel may be mounted with its lower extremity an appreciably distance above the floor. As the truck in FIG. 3 begins to overturn by rotating clockwise, the weight on drive wheel 11 is transferred to caster wheel means 12. Because caster wheel means 12 is resiliently attached to the truck, that causes a lowering of the truck, putting auxiliary wheel 14 nearer the floor than dimension CL, and hence the truck only need tilt through an angle much smaller than angle $\alpha$ before auxiliary wheel 14 engages the floor.

Figure 1A:
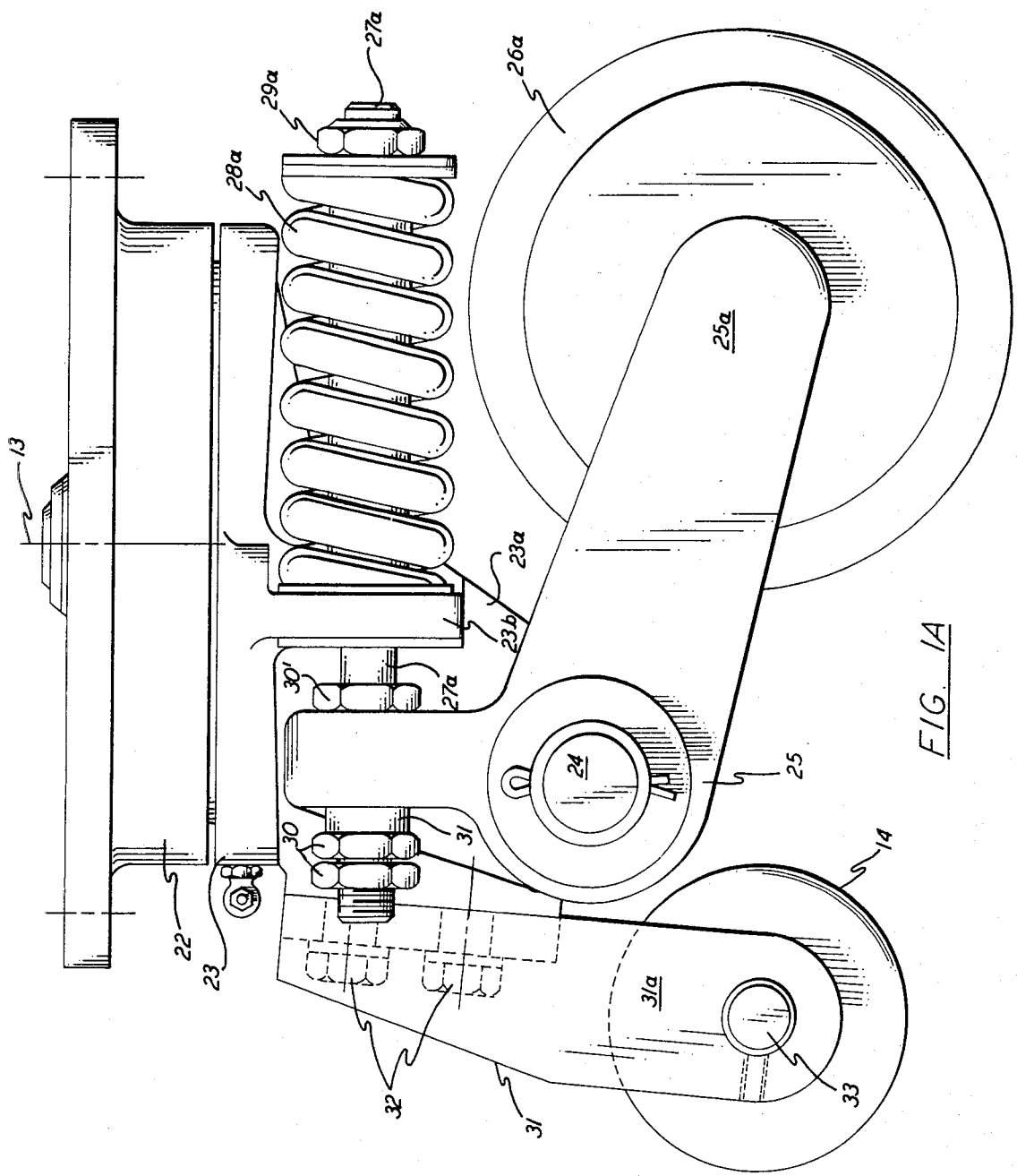
FIGS. 1a and 1b are side elevation and front elevation views, respectively, illustrating one form of the invention installed on an otherwise conventional caster wheel assembly.
Figure 1B:
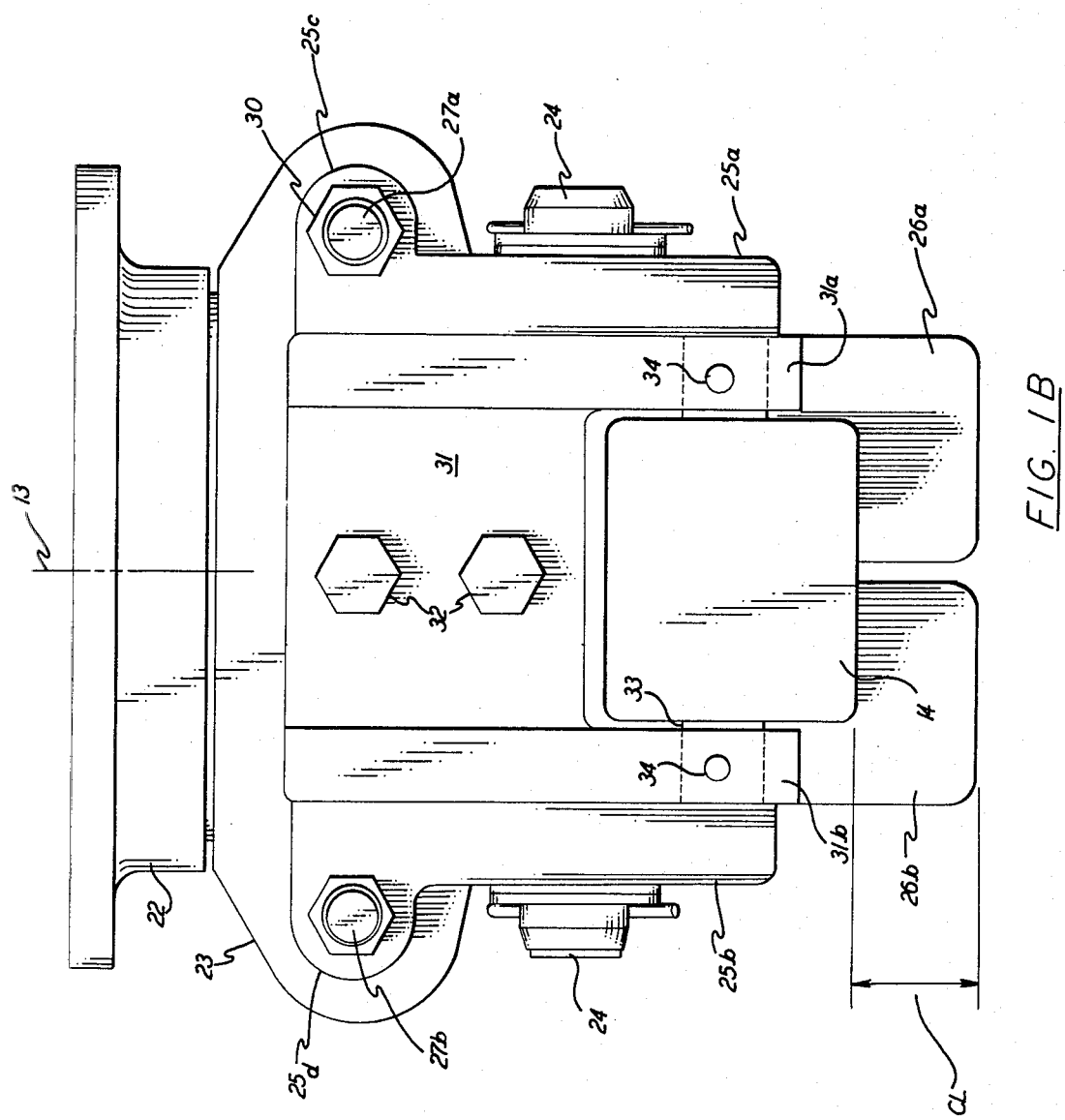

FIGS. 1a and 1b illustrate a specific exemplary embodiment of the invention. An upper member 22 which is bolted to the base (not shown) of the truck contains a bearing (not shown) to journal caster assembly member 23 for rotation about vertical castering axis 13. Member 23 includes a depending plate portion 23a through which shaft 24 passes to pivotally support yoke member 25. Yoke member 25 comprises two arms 25a,25b which extend on opposite sides of arm portions 23a to rotatably support caster wheel means shown as comprising a pair of caster wheels 26a,26b.

A pair of rods 27a,27b pass through respective holes in a pair of depending tab portions of member 23, one of which depending tab portions is shown at 23b. A compression spring is provided on each rod, as at 28a, and held thereon by washers and a nut, as at 29a. Yoke 25 is provided with two tab portions 25c,25d each containing a spherical bearing (not shown). Rods 27a,27b are held in the inner races of the spherical bearings. Nuts 30,30 and a spacer 31 are provided on the end of each rod. Each rod is provided with an integral hexagonal shoulder, as at 30', so that the rod may be held while the nuts on it (as at 29a and 30,30) are tightened. The use of spherical bearings in the tab portions of the yoke allows the yoke to pivot without bending the rods. Thus the compression springs resiliently mount the caster wheel means on caster assembly member 23, and the caster wheel means may move up and down relative to the base of the truck as the caster wheel means encounter minor rises and depressions in the floor. A cylindrical sleeve carried on each rod inside its respective spring limits how much each spring can be compressed. The manner in which the caster wheel means is shown mounted is old and well known, and indeed everything thus far described in connection with FIGS. 1a and 1b is completely conventional.

In accordance with the invention auxiliary wheel means 14 is mounted on caster assembly member 23. Member 31 is bolted to caster assembly member 23 by means of bolts 32,32. A shaft 33 extending between yoke arm portions 31a,31b of member 31 is pinned to member 31 as by means of pins at 34,34, and shaft 33 rotatably carries auxiliary wheel 14. It will be seen that axle 33 is parallel to the axis of rotation of the caster wheel means 26a,26b, but situated on the opposite side of castering axis 13 therefrom. Further, it may be noted that the axis of axle 33 is located at a greater radial distance from castering axis 13 than is the axis of rotation of the caster wheel means 26a,26b, and that auxiliary wheel 14 has a smaller diameter than caster wheel means 26a,26b. The use of a small diameter for auxiliary wheel 14 allows its axis of rotation at axle 33 to more closely approach the lateral extremity of the truck, and thereby maximizes the dimension shown as $d_3$ in FIG. 3. The use of small-diameter wheels ordinarily results in rapid wear, but because auxiliary wheel 14 will rarely (and perhaps even never) be caused to engage the floor, possible wear of that wheel is deemed unimportant.

While the invention has been described as including an auxiliary wheel mounted for rotation on the caster wheel assembly, it will become clear upon reflection, and by considering operation if auxiliary wheel 14 were locked, that use of a rounded fixed object would provide generally similar operation to prevent overturning, though use of a wheel capable of turning is preferred.

Auxiliary wheel 14 is mounted at an elevation such that it readily clears the floor by an appreciable fraction of an inch (e.g. 0.625 in.) during normal travel, but as initial tilting of the truck transfers the weight from the drive wheel to the caster wheel means, so that the corner of the truck carrying the auxiliary wheel lowers, the auxiliary wheel is placed very near the floor, and then very little angular tilt of the truck is required before the auxiliary wheel engages the floor to stop further tilting.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

We claim:

1. In a lift truck having a pair of front non-steerable load wheels spaced laterally apart at equal distances on opposite sides of a centerline, a steerable rear drive wheel mounted on a first side of said centerline, and a caster wheel assembly mounted to swivel about a castering axis located on the opposite side of said centerline, said caster wheel assembly including resiliently mounted caster wheel means adapted to rotate about an axle axis displaced from said castering axis and normally to resiliently support a portion of the weight of said truck; the improvement which comprises an auxiliary wheel mounted on said caster wheel assembly to swivel with said caster wheel means about said castering axis, and mounted so as not to engage the floor unless lateral tilting of the truck exceeds a predetermined amount.

2. The truck according to claim 1 wherein said auxiliary wheel is rigidly affixed to said caster wheel assembly.

3. The truck according to claim 1 wherein the axle of said auxiliary wheel is parallel to the axle of said caster wheel means.

4. The truck according to claim 1 wherein the axle of said auxiliary wheel is located on the opposite side of said castering axis from the axle of said caster wheel means.

5. The truck according to claim 1 wherein said auxiliary wheel has a smaller diameter than that of said caster wheel means.

6. The truck according to claim 1 wherein the axle of said auxiliary wheel is located further from said castering axis than the axle of said caster wheel means.

7. The truck according to claim 1 wherein said auxiliary wheel has a smaller diameter than that of said caster wheel means and wherein the axle of said auxiliary wheel is located further from said castering axis than the axle of said caster wheel means.

* * * * *